United States Patent [19]

Francois

[11] Patent Number: 4,804,014

[45] Date of Patent: Feb. 14, 1989

[54] SERVO DEVICE FOR CONTROLLING THE FLOW RATE OF A HYDRAULIC SYSTEM, IN PARTICULAR THE POWER-ASSISTED STEERING OF A VEHICLE

[75] Inventor: Marc Francois, Vincennes, France

[73] Assignee: Bendix France, Drancy, France

[21] Appl. No.: 860,358

[22] Filed: May 6, 1986

[30] Foreign Application Priority Data

May 15, 1985 [FR] France .................. 85 07353

[51] Int. Cl.[4] .................. B62D 5/08; G05D 7/00
[52] U.S. Cl. .................. 137/501; 137/504; 137/599
[58] Field of Search .................. 137/501; 251/129.11

[56] References Cited

U.S. PATENT DOCUMENTS

| 2,755,058 | 7/1956 | Margrave | 251/30.02 X |
| 3,424,196 | 1/1969 | Donner | 137/504 |
| 3,724,494 | 4/1973 | Alber | 137/501 |
| 4,526,342 | 7/1985 | Wakefield | 251/129.11 X |

FOREIGN PATENT DOCUMENTS

| 0072732 | 2/1983 | European Pat. Off. . |
| 2412337 | 10/1974 | Fed. Rep. of Germany . |
| 2410489 | 10/1974 | Fed. Rep. of Germany . |
| 2207481 | 6/1974 | France . |

Primary Examiner—Arnold Rosenthal
Attorney, Agent, or Firm—Larry J. Palguta; Ken C. Decker

[57] ABSTRACT

The flow-rate control device (10), which is arranged in a branch line (6), comprises a slide (19) forming, together with an outlet channel, a variable constriction ($v_1$), the slide being biased by a spring, one end of which bears against the end of an acutating rod (30) biased by a piston (21) actuated by a speed-reducing servo-drive unit (22) controlled by an electrical signal (11) dependent on a significant parameter, for example the speed of a vehicle for power-assisted steering of the vehicle. The rod (30) further controls an internal bypass passage (33, 34) parallel to the variable constriction ($v_1$).

2 Claims, 3 Drawing Sheets

SERVO DEVICE FOR CONTROLLING THE FLOW RATE OF A HYDRAULIC SYSTEM, IN PARTICULAR THE POWER-ASSISTED STEERING OF A VEHICLE

The present invention relates to the servo devices for controlling the fluid in a hydraulic system, in particular the power-assisted steering of a vehicle, comprising a pressure source, the outlet of which is connected to a hydraulic motor control system, the servo device being intended to be interposed in a branch line between the outlet of the pressure source and a tank, and comprising, inside a body, a modulator assembly with a slide biased by a spring and forming a first variable constriction, between an inlet passage intended to be connected to the outlet of the source and an outlet passage intended to be connected to the tank, the position of the slide being controlled by an electro-magnetic actuating member in dependence of an electrical control signal, for example dependent on the speed of the vehicle for power-assisted steering.

A servo control device of this type is described in the document DE-A-2,412,337 which relates, in fact, to a servo device for controlling the pressure supplied to the hydraulic motor of a power-assisted steering system, in which device the slide of the modulator assembly is mechanically coupled to the plunger of an electromagnetic actuating member of the solenoid type, the position of the plunger, dependent on the electrical control signal, directly controlling the position of the slide, in accordance with an arrangement which requires a precise and intense magnetic field to be permanently exerted on the plunger operating the slide and does not prevent, in accordance, in particular, with fluctuations in the electrical control signal, the danger of hammering of the slide/plunger assembly and consequently subjects the delicate elements of this assembly to stresses, or even untimely impacts likely to cause rapid deterioration in the operation thereof, the creation of a precise magnetic field requiring, moreover, a relatively sophisticated and expensive electrical control and operating system.

One object of the present invention is to propose a device of the above mentioned type, which functions as a flow-rate regulator in accordance with a simple, sturdy and reliable arrangement involving low manufacturing costs and offering a great degree of flexibility as regards use.

For this purpose, according to a feature of the invention, the magnetic actuating member has a piston operated by an electrical position-controlled motor, typically a speed-reducing unit with an output recopying device, and biasing an output member cooperating functionally with the modulator slide so as to modify its position in accordance with the position of the output member determined by the piston.

In such an arrangement implementing an electrical servomotor, typically a non-reversible speed-reducing unit with a high step-down ratio, and an output member not directly in contact with the modulator slide, the position of the output member may be determined and maintained in a very precise manner without the need for sophisticated control and operating circuits. In addition, the precise nature of the position control of the output member means that the latter may be given an additional regulating function.

Thus, according to another feature of the invention, the output member controls, in accordance with its position, an internal calibrated bypass passage between the inlet and outlet ducts. As a result of such an arrangement, it is possible, in the case of a power-assisted steering system of a vehicle, to modulate continuously the amount of fluid supplied to the hydraulic assistance motor and, therefore, to modulate the power assistance in accordance with the control parameter, typically the speed of the vehicle, and, in certain special conditions, typically for high vehicle speeds, to achieve, by opening the internal calibrated bypass passage, a maximum reduction in the power assistance while avoiding a too sharp knee of the pressure/torque characteristic curve.

According to one aspect of the invention, the slide of the modulator assembly has a fixed internal constriction and the output member forms a moveable stop for one end of the spring biasing this slide.

According to another aspect of the invention, the slide of the modulator assembly separates two chambers communicating with the inlet and outlet passages, respectively, the output member forming, in addition, a second constriction, which can be modulated in accordance with the position of the output member, between these two chambers.

Other features and advantages of the present invention will emerge from the following description of exemplary but entirely non-limiting embodiments, with reference to the attached drawings in which.

In the description which follows and in the drawings, identical or similar elements have the same reference numbers.

Figure 1:
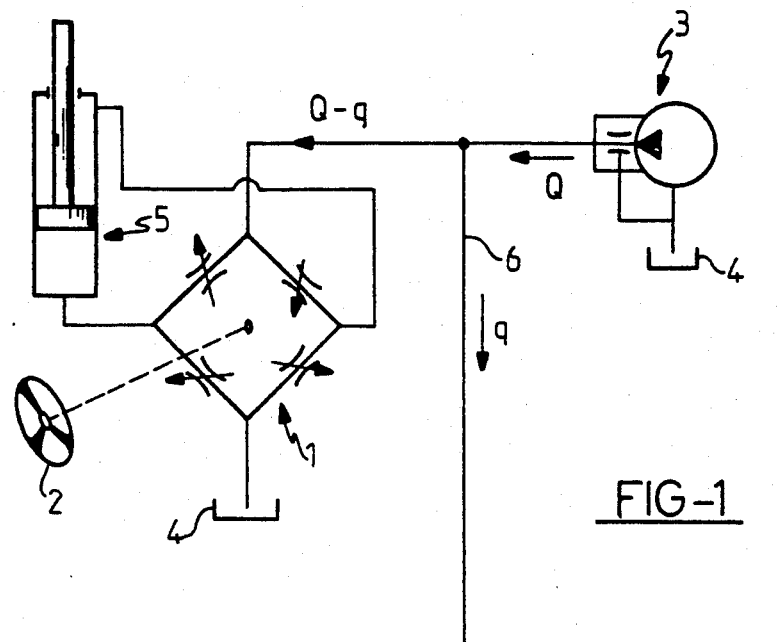
FIG. 1 is a synoptic diagram of a hydraulic system for the power-assisted steering of a vehicle, comprising a first embodiment of the flow rate controlling servo device according to the invention.
Figure 1:
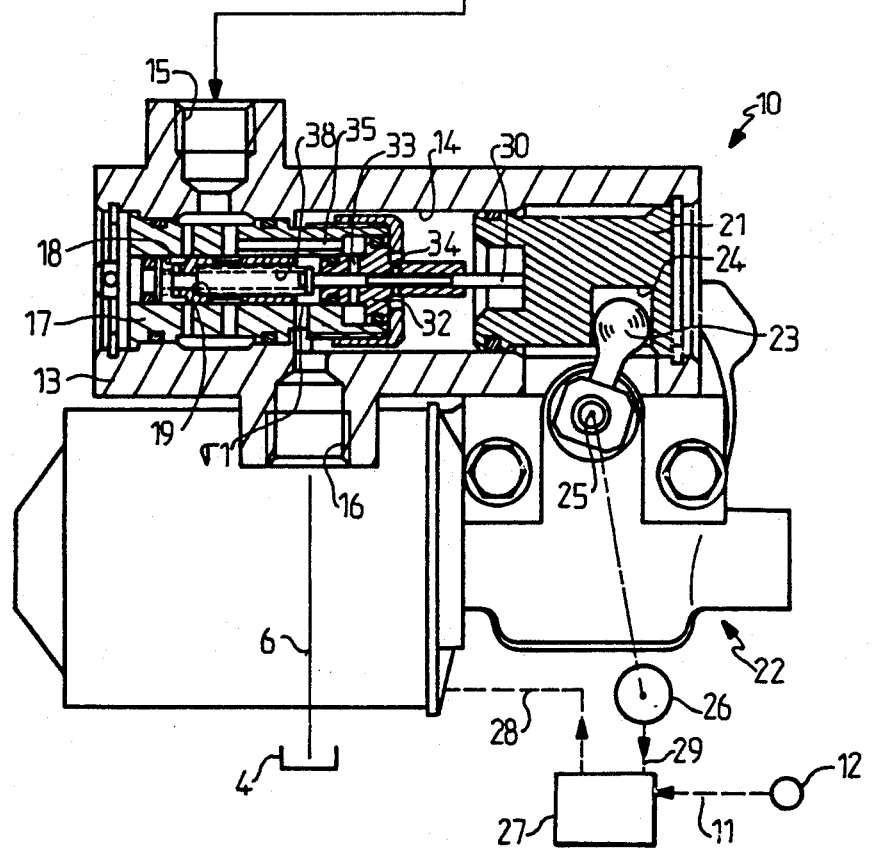

FIG. 1 shows a power-assisted steering system for a vehicle comprising, in a manner known per se, a distribution servo valve 1 which is actuated by the steering wheel 2 and located between a source of pressurized fluid 3, generally equipped with an integrated flow-rate regulator device, and a tank 4 so as to selectively and alternately supply with pressurized fluid the opposite chambers of a hydraulic motor 5 for power-assisted steering. According to the invention, a control device, generally indicated by the reference number 10, is inserted between the outlet of the pressure source 3 and the tank 4, which device controls the amount of fluid bypassed into the branch line 6 (and therefore diverted away from the steering servo valve 1) in response to an electrical signal 11 generated by a sensor 12 providing a characteristic parameter, typically the speed of movement of the vehicle.

The flow rate controlling servo device 10 according to the invention, comprises a body 13 inside which there is formed a stepped recess 14 into which open, axially spaced from each other, an inlet passage 15, intended to be connected to the portion of the branch line 6 coming from the pressure source 3, and an outlet passage 16, intended to be connected to the down-stream portion of the branch line 6 communicating with the tank 4. Mounted inside the recess 14 there is a block 17 having a central bore 18 within which is slideably mounted a modulator slide 19 forming, with its rear end, a variable constriction $v_1$ with a radial channel 20 formed in the block 17 and communicating with the outlet opening 16. Inside the recess 14 there is slideably and sealingly mounted a piston 21 actuated by an electrically controlled speed-reducing unit 22 with a high step-down ratio mounted on the body 13, via a crank pin 23 accommodated inside a lateral recess 24 of the piston 21 and coupled to the output shaft 25 of the speed-reducing unit 22, the crank pin 23 thus pivoting in accordance with the angle of rotation of the output shaft 25. The output shaft 25 is coupled to a recopying device 26, for example with a rotary potentiometer or optoelectronic sensor providing a control unit 27, supplying the electric motor of the speed-reducing unit 22 via a line 28 and receiving the input signal 11, with a return signal 29, in a general arrangement where the servomotor is controlled in a closed loop. The piston 21 axially biases a rod 30 cooperating functionally with the modulator slide 19 as will be seen below.

Figure 2:
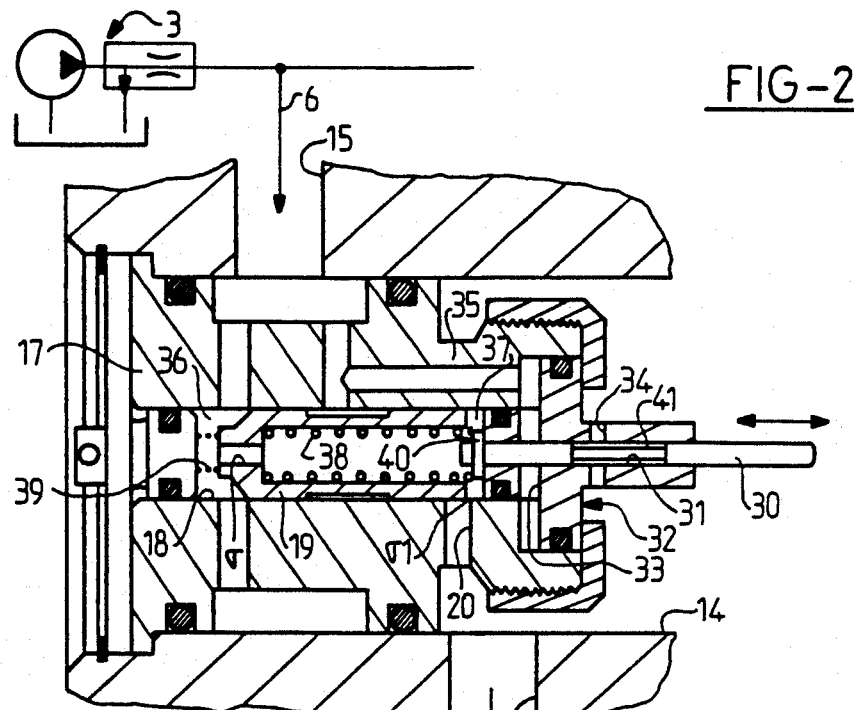
FIG. 2 is a partially sectioned view of the modulator assembly shown in FIG. 1.
Figure 3:
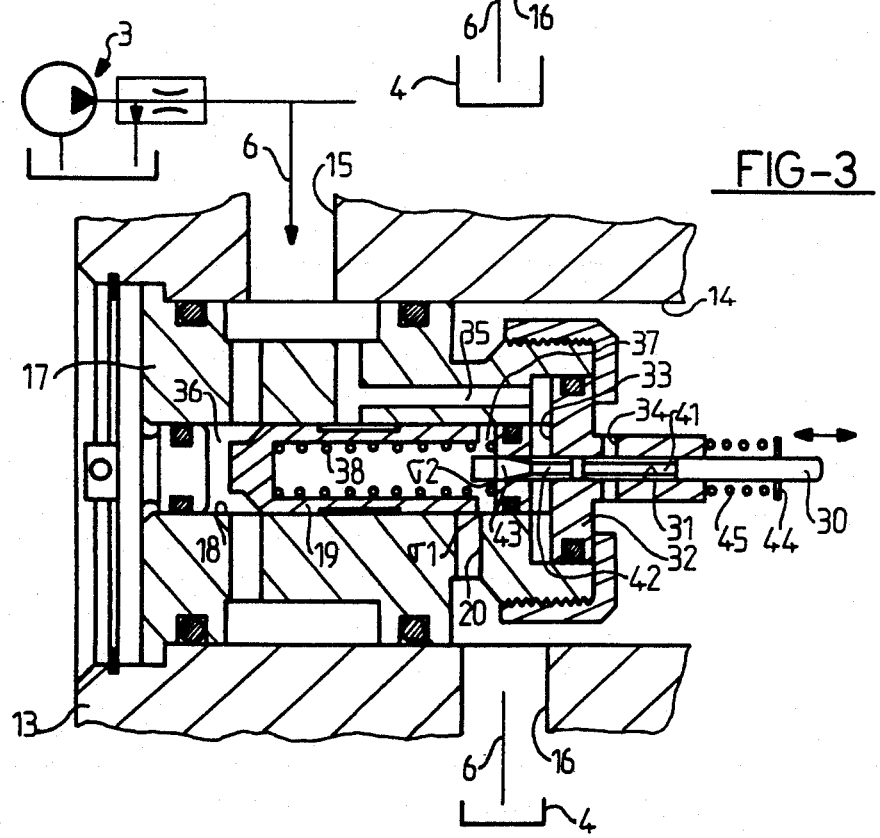
FIG. 3 is a view similar to that of FIG. 2, showing a second embodiment of the modulator assembly according to the invention.

More specifically, as can be seen in FIGS. 2 and 3, the rod 30 is slideably and sealingly mounted inside a bore 31, coaxial with the bore 18, of a cover-block 32 which is mounted on the block 17 and seals off the end of the bore 18 adjacent to the channel 20, the space inside the recess 14 in front of the piston 21 and around the rod 30 communicating freely with the channel 20 and the outlet passage 16. The cover-block 32 is formed internally with two openings 33 and 34 which open into the bore 31 at points axially spaced from each other. The opening 33 communicates permanently, via a channel 35 formed in the block 17, with the inlet passage 15, the opening 34 communicating permanently with the outlet passage 16. The slide 19 defines, inside the bore 18, in inlet chamber 36 communicating with the inlet passage 15, and an outlet chamber 37 into which the radial channel 20 and the end of the bore 31 opposite the piston 21 open. The slide 19 is biased in the direction opposite to the cover-block 32 by a calibrated spring 38 accommodated inside a longitudinal recess inside the slide 19.

In the embodiment shown in FIGS. 1 and 2, the slide 19 has a fixed internal constriction $v$ forming a connection between the chambers 36, 37, the slide 19 being biased, against the spring 38, by a second spring 39 arranged in the inlet chamber 36. In this embodiment, the end of the rod 30 which is opposite the piston 21 and projects into the outlet chamber 37 has a collar 40 forming a moveable bearing point for the end of the spring 38 opposite the bearing point of this spring 38 inside the slide 19. Since the amount of fluid bypassed into the branch line 6, which is controlled by the variable constriction $v_1$, is proportional to the calibrating force exerted by the spring 38 on the slide 19, the movement of the rod 30, from its rest position shown in FIG. 2, thus causes a modification of the force of the spring 38 tending to open the constriction $v_1$ further and therefore increasing the amount of fluid bypassed into the line 6 when, typically, the speed of the vehicle increases.

Figure 4:
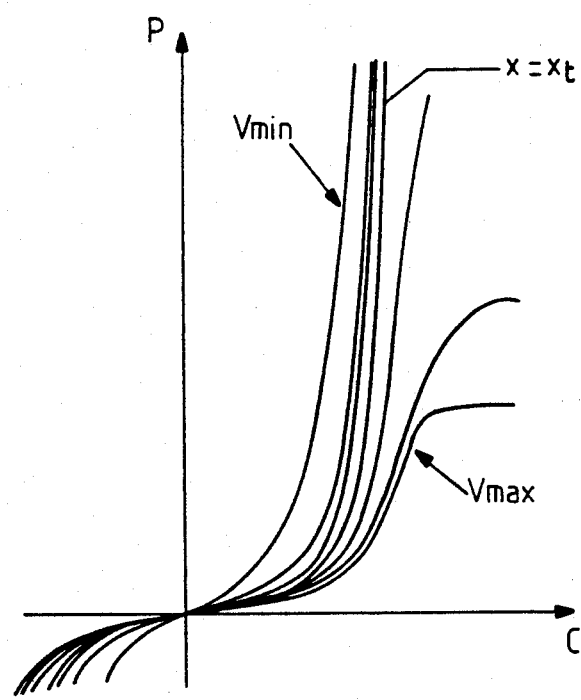
FIG. 4 is a diagram showing the pressure/torque curves obtained using a servo control device according to the invention.

According to a feature of the invention, the rod 30 has, inside the bore 31, a portion of reduced diameter 41 capable, when the rod 30 has moved in the direction of the inlet chamber 36 by a given amount $x_t$, of establishing a direct communication between the openings 33 and 34, thereby establishing a calibrated internal bypass passage between the inlet passages 15 and 16, parallel to the variable constriction $v_1$. As can be seen in FIG. 4, if the rod 30 is not moved by an amount greater than $x_t$, by modifying the force of the spring 38 it is possible to obtain, for middle-range or low vehicle speeds, different characteristic curves which are slightly offset with respect to each other. On the other hand, when the rod 30 is moved by an amount greater than the amount $x_t$ and the rod 30 continues to be moved towards the inlet chamber 36, in this case curves are obtained which tend substantially asymptotically towards different limit values.

The embodiment shown in FIG. 3 is, generally speaking, identical to that described with reference to FIGS. 1 and 2, the differences residing in the mode of functional cooperation between the rod 30 and the slide 19. In this embodiment, the slide 19 separates in a sealed manner the inlet chamber 36 and the outlet chamber 37 (fixed internal constriction $v$ is not needed) and is biased by the single spring 38. In this embodiment, the rod 30 has, at its end opposite to the actuating piston 21, a second portion of reduced diameter 42 separated axially from the first portion of reduced diameter 41 by a rod portion having the same diameter as the bore 31, this second portion of reduced diameter 42 being extended, outwardly, by a profiled zone 43 which becomes wider and forms, together with the end of the bore 31 opening into the outlet chamber 37, a second variable constriction $v_2$, between the rear chamber 37 and the opening 33 in the cover-block 32 communicating with the inlet passage 15. Thus, in accordance with the movement of the rod 30, the second variable constriction $v_2$ creates, in the rear chamber 37, a modulated counter-pressure determining, together with the spring 38, the position of the slide 19 and, therefore, the size of the first variable constriction $v_1$, the displacement of the slide 19 thus being controlled hydraulically, but operating essentially in the same manner as in the embodiment described above. The rod 30 has advantageously an external collar 44 for a return spring 45 bearing against the rear of the cover-block 32.

Although the present invention has been described in connection with particular embodiments, it is not limited thereby, but, on the contrary, may be subject to modifications and variations deemed necessary by a person skilled in the art.

I claim:

1. A servo device for controlling the fluid of a hydraulic system, in particular the power-assisted steering of a vehicle, comprising a pressure source having an outlet connected to a system for controlling a hydraulic motor, the device being intended to be interposed in a branch line between the outlet of the pressure source and a tank, and comprising, inside a body, a modulator assembly with a modulator slide biased by a spring and forming a first variable constriction between an inlet passage, intended to be connected to the outlet of the pressure source, and an outlet passage intended to be connected to the tank, the position of the slide being controlled, in dependence of an electrical control signal, by an electromagnetic actuating member, characterized in that the electromagnetic actuating member has a piston actuated by an electrical servomotor and which biases an output member cooperating functionally with the modulator slide so as to modify the position of the modulator slide in accordance with the position of the output member as determined by the piston, the slide separating two chambers communicating with the inlet passage and the outlet passage, respectively, the output member forming, between the two chambers, a second variable constriction in accordance with the position of the output member, so that the servo device produces a continuous gradual regulation of fluid flow, the slide mounted slideably inside a first bore, and the output member further comprising a rod mounted slideably and sealingly inside a second bore which is coaxial with the first bore and opens into the latter and into which open, at locations spaced axially apart from each other, openings communicating with the inlet passage and the outlet passage, respectively, the rod having a portion of reduced diameter capable of establishing a communication between the openings.

2. The device according to claim 1, characterized in that the rod has a profiled end portion located opposite the piston and cooperating with the second bore so as to form the second variable constriction.

* * * * *